United States Patent
Lewis et al.

(10) Patent No.: US 8,949,352 B2
(45) Date of Patent: Feb. 3, 2015

(54) DOCUMENT SHARING THROUGH BROWSER

(75) Inventors: Cassandra Lewis, Mountain View, CA (US); Heidi McAllister, Brier, WA (US); Chad Nedziek, Redmond, CA (US)

(73) Assignee: Microsoft Corporation, Redmond, WA (US)

( * ) Notice: Subject to any disclaimer, the term of this patent is extended or adjusted under 35 U.S.C. 154(b) by 180 days.

(21) Appl. No.: 13/284,326

(22) Filed: Oct. 28, 2011

(65) Prior Publication Data

US 2013/0110941 A1 May 2, 2013

(51) Int. Cl.
*G06F 15/16* (2006.01)
*G06F 17/30* (2006.01)

(52) U.S. Cl.
CPC .............................. *G06F 17/30876* (2013.01)
USPC ..................................................... 709/206

(58) Field of Classification Search
USPC ................................................ 709/206, 204
See application file for complete search history.

(56) References Cited

U.S. PATENT DOCUMENTS

| | | | |
|---|---|---|---|
| 6,732,145 B1 * | 5/2004 | Aravamudan et al. | 709/204 |
| 7,421,469 B1 * | 9/2008 | Liu et al. | 709/204 |
| 7,461,347 B2 | 12/2008 | Zhu et al. | |
| 2009/0063945 A1 * | 3/2009 | Bhogal et al. | 715/203 |
| 2009/0172043 A1 | 7/2009 | Dullanty et al. | |
| 2009/0307602 A1 | 12/2009 | Brewer et al. | |
| 2010/0174773 A1 * | 7/2010 | Penner et al. | 709/203 |
| 2010/0185747 A1 | 7/2010 | Ruhlen et al. | |
| 2010/0257456 A1 * | 10/2010 | Lieb et al. | 715/741 |
| 2010/0262925 A1 | 10/2010 | Liu et al. | |
| 2010/0281362 A1 | 11/2010 | Bailor et al. | |
| 2011/0173589 A1 | 7/2011 | Guttman et al. | |

OTHER PUBLICATIONS

"Introduction to PowerPoint Web App", Retrieved at << http://office.microsoft.com/en-ca/web-apps-help/introduction-to-powerpoint-web-app-HA010378340.aspx>>, Retrieved Date: Sep. 22, 2011, pp. 4.

"Broadcast Power Point presentations to small groups", Retrieved at << http://office.microsoft.com/en-us/powerpoint-help/broadcast-powerpoint-presentations-to-small-groups-HA001034814.aspx >>, Retrieved Date : Sep. 22, 2011, pp. 3.

* cited by examiner

*Primary Examiner* — Esther Benoit
(74) *Attorney, Agent, or Firm* — Steve Crocker; Jim Ross; Micky Minhas

(57) ABSTRACT

Presenters are enabled to broadcast a document to remote viewers from one browser to another. While viewing a document in the web browser, a user can share the document out to remote viewers by providing them with a link that when selected, opens the document synchronously with the presenter in web browser. The viewers are enabled to consume the broadcast by watching the presenter go through the document in real time. The viewers may also be enabled to view the document asynchronously from the presenter and easily synchronize back with the presenter's view.

19 Claims, 9 Drawing Sheets

DOCUMENT SHARING THROUGH BROWSER

BACKGROUND

Productivity tools are software applications providing word processing, spreadsheet, email exchange, presentation, and similar capabilities to users. Conventional productivity tools are locally installed applications. Thus, sharing documents with other users in real time (e.g., in an online meeting) may require interaction between a productivity application and an online meeting application, where incompatibility issues may cause degradation of user experience. Furthermore, manual processing such as uploading of a document, etc. may be required and presenters may lose interaction capabilities with individual documents. For example, an online meeting application may treat documents similar to images. Thus, a presenter of the document may not be able to navigate through the document as they could using a native application.

With the proliferation of networking capabilities, productivity tools, similar to other applications, are being offered as web applications. Users are enabled to access documents stored on networked data stores through a browser with a user interface for editing the documents provided by respective productivity applications. This enables users to access documents anywhere, anytime without being constrained to a specific computing device and having to deal with complexities of installing and maintaining local applications. Even web-based productivity tools are separate from online meeting applications making integrated presentation of documents difficult.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to enabling a presenter to broadcast a document to remote viewers from one browser to another. While viewing a document in the web browser, a user can share the document out to remote viewers by providing them with a link that when selected, opens the document synchronously with the presenter in web browser. The viewers are enabled to consume the broadcast by watching the presenter go through the document in real time. The viewers may also be enabled to view the document asynchronously from the presenter and easily synchronize back with the presenter's view.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
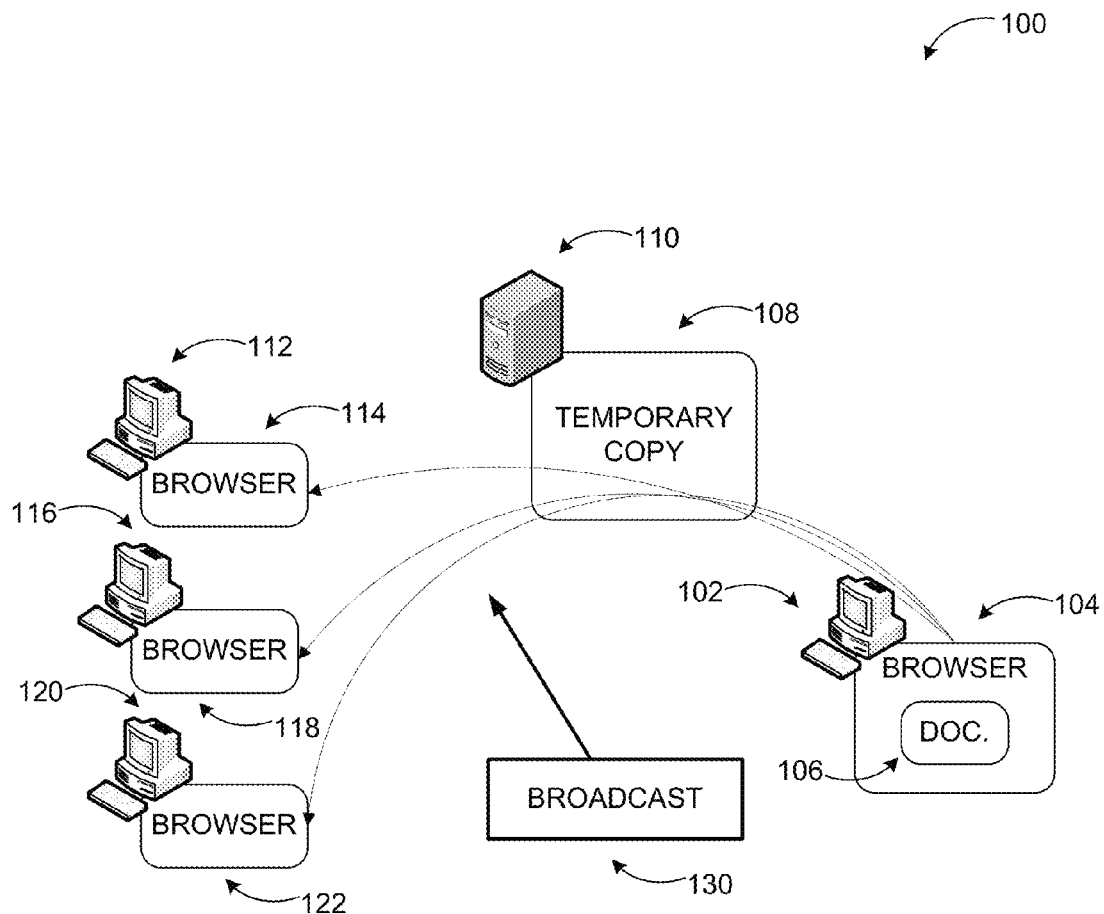
FIG. 1 illustrates an example system providing real time document sharing through browsers according to embodiments.

As briefly described above, documents such as word processing, spreadsheet, presentation, and other documents may be broadcast by a presenter through a web application interface enabling the presenter to edit a document and viewed by viewers through their respective browsers as the presenter is navigating through the document.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents. While the embodiments will be described in the general context of program modules that execute in conjunction with an application program that runs on an operating system on a computing device, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable media.

Throughout this specification, the term "platform" may be a combination of software and hardware components for enabling real time document sharing through browsers. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

FIG. 1 illustrates an example system providing real time document sharing through browsers according to embodiments. As illustrated in diagram 100, users in a networked environment may be enabled to access documents through their browsers and create, edit, delete, and/or share the documents. A server 110 facilitating one or more web applications for managing the documents may communicate with client devices 102, 112, 116, and 120 and enable a user interface associated with editing a particular type of document to be presented by the user's browser (104, 114, 118, and 122).

In a system according to embodiments, the web applications at the server 110 may also facilitate real time document sharing through the user interfaces presented by the browsers. In one example, a broadcast control may be provided through the user interface. Upon activation of the broadcast control through browser 104 by a presenter while viewing a document 106, a temporary copy 108 of the document 106 may be created at the server 110 and a link to the document provided to the presenter. The presenter may then send the link to viewers via an email, a text message, or similar means. The viewers may activate the link through their browsers 114, 118, and 122, and view the document synchronously with the presenter as the presenter navigates through the document during a broadcast session 130. In some embodiments, the actual document that is being viewed by the presenter (document 106) may be the one that is broadcast to the attendees.

In addition to navigating through the document, the presenter may be enabled to perform other actions such as searching for text or objects, highlighting portions of the document, activating an animation, playing audio or video media, etc., all of which may be viewed by the viewers.

In some embodiments, the viewers may be enabled to navigate through the document using their browsers (with the editing user interface provided by the web application) independently from the presenter. The viewers may be enabled to move back and forward through the document, activate/reactivate animations, change a pace of played media, etc. In other embodiments, the viewers may be enabled to synchronize back with the presenter after having viewed the document asynchronously for a period. If a viewer views the presented document asynchronously from the presenter during which time, the presenter may have edited the document, the viewer may be provided with an alert upon attempting to synchronize back (e.g., a dialog box) indicating that they are going back in-synch with the presenter and the modified document may be refreshed. Regardless of whether the attendee is in asynchronous mode or synchronous mode, they may be removed from viewing broadcast upon termination of the broadcast by the presenter and a "broadcast has ended" type of message may be displayed.

Figure 2:
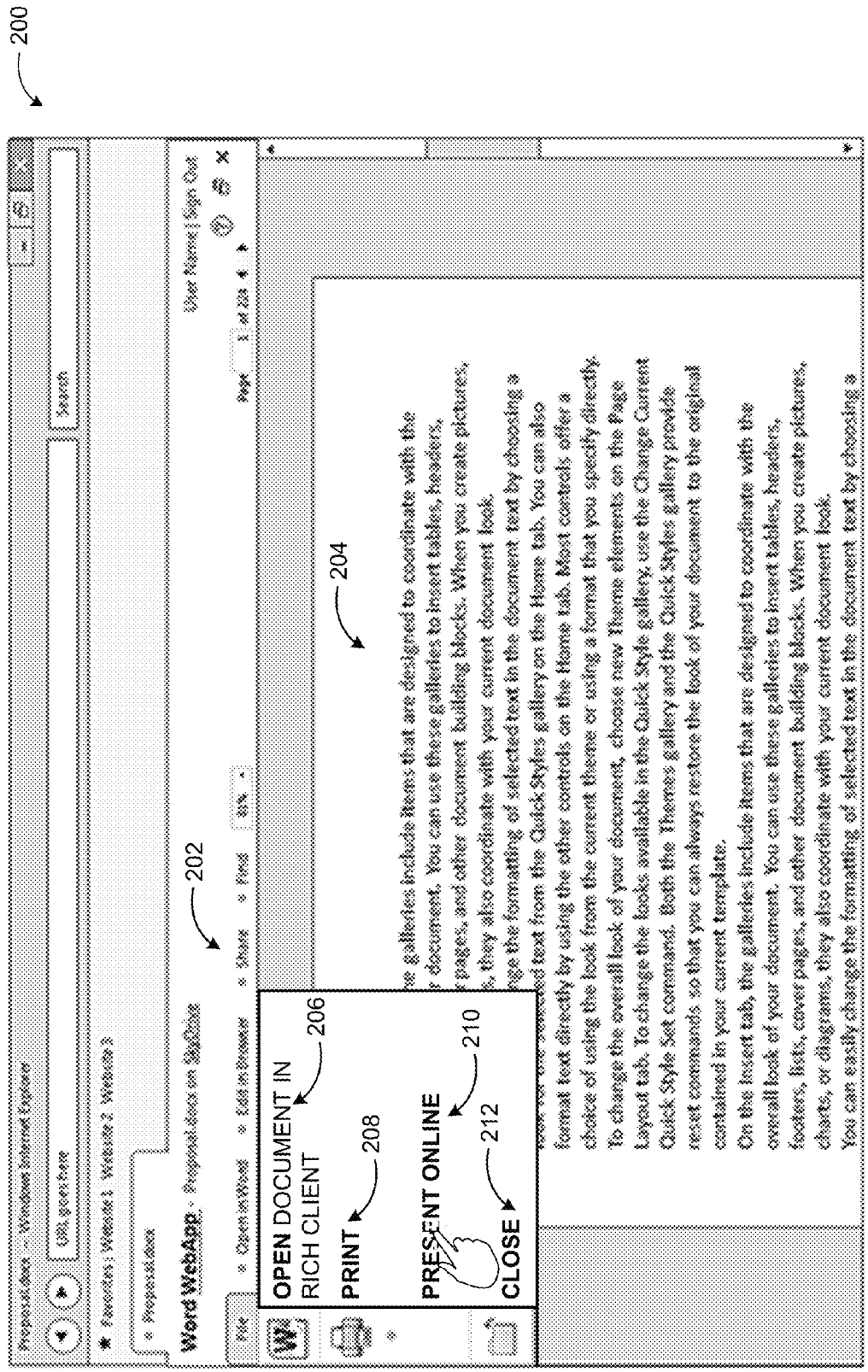
FIG. 2 illustrates a screenshot of an example browser view enabling a presenter to initiate a broadcast session sharing a viewed document.

FIG. 2 illustrates a screenshot of an example browser view enabling a presenter to initiate a broadcast session sharing a viewed document. Screenshot 200 includes a generic web browser displaying a user interface for viewing and editing a word processing document. While word processing documents and textual content are used as example illustrations of embodiments in FIG. 1 through FIG. 6, embodiments are not limited to word processing documents or textual content. Other types of documents such as spreadsheets, presentation documents, emails, notes, and similar ones may be shared employing a system according to embodiments. Moreover, shared documents may include textual, graphical, audio, video, and other content.

In a system according to embodiments, the document sharing may be facilitated through a productivity web application. The user interface provided by the web application for the user to view and edit a document 204 may include textual and/or graphic menus 202 for performing various actions on the document 204. The entry points for the unmanaged experience may be in one of the menus of the web application viewer and editor or provided as an icon/textual command on the main user interface. In the illustrated example, the document sharing control 210 ("Present Online") is provided under the "File" menu along with open document control 206, print control 208, and close document 212.

Figure 3:
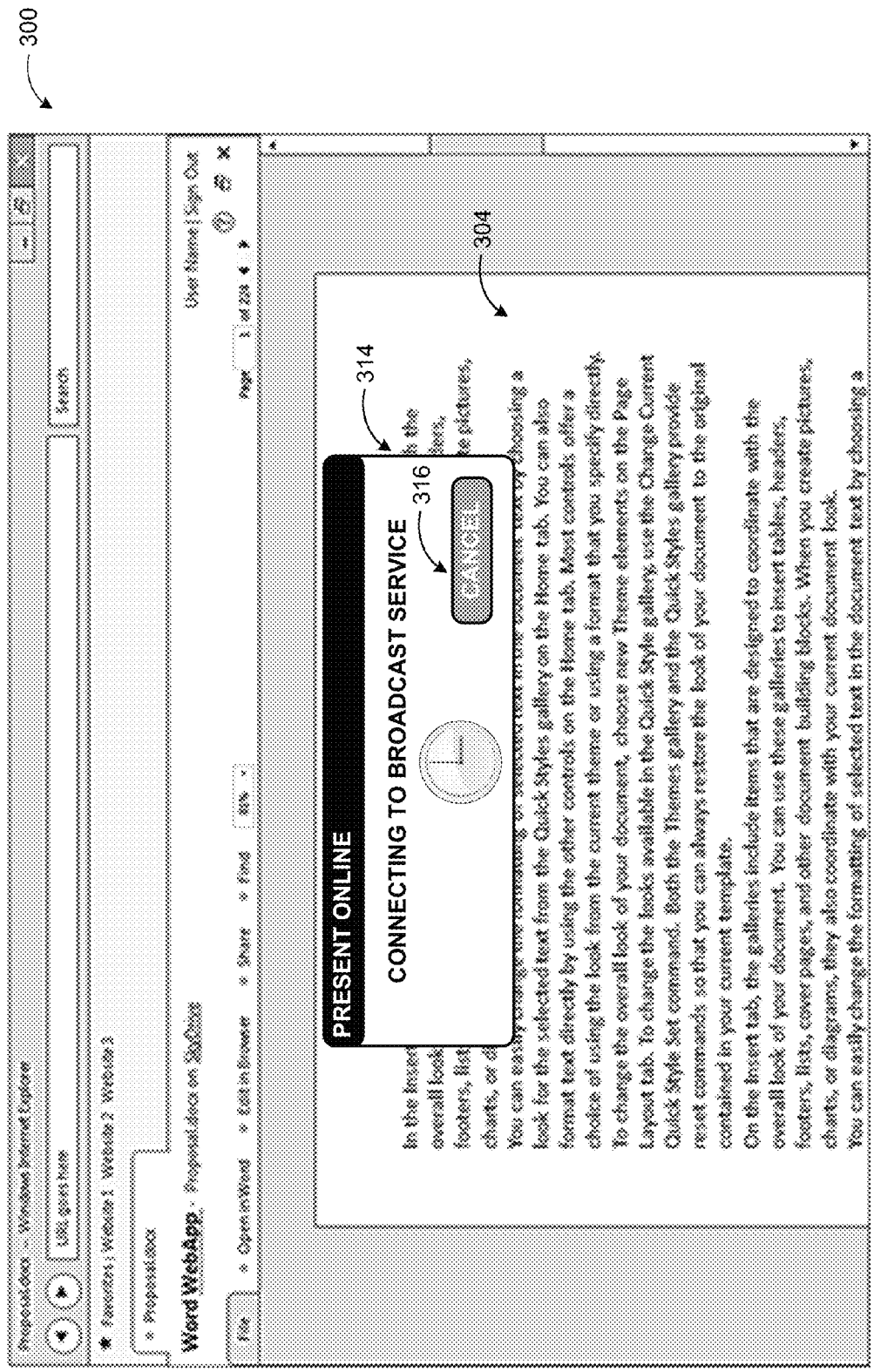
FIG. 3 illustrates a screenshot of the example browser view initiating the broadcast session.

FIG. 3 illustrates a screenshot of the example browser view initiating the broadcast session. Screenshot 300 displays the same user interface as in FIG. 2 upon activation of the document sharing control 210.

As the server executing the web application performs operations preparing for the document to be shared, which may include creating a link to the document, and providing the link back to the presenter, a dialog box 314 may be displayed over the document 304 indicating that the document sharing process is beginning. A cancel option 316 may be presented to the presenter enabling the presenter to opt out of the broadcast and return to the edit/view screen.

Figure 4:
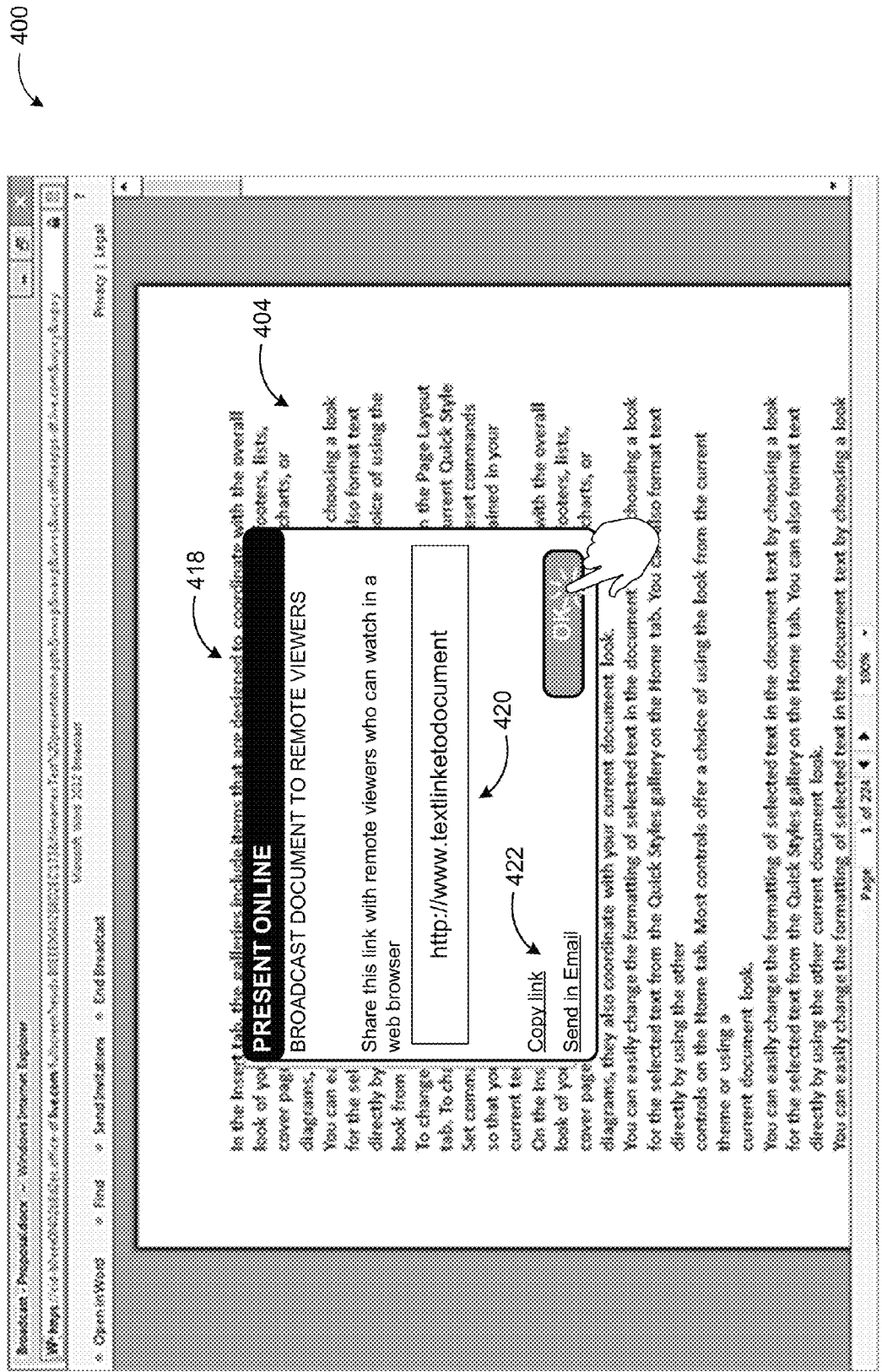
FIG. 4 illustrates a screenshot of the example browser view providing presentation link to the presenter.

FIG. 4 illustrates a screenshot of the example browser view providing presentation link to the presenter. Screenshot 400 displays a step in the process following the example view shown in FIG. 3.

Once the server executing the web application creates a link 420 to the document to-be-shared, the link 420 may be provided to the presenter in dialog box 418 over the document 404. In addition to indicating to the presenter that they can provide the link to any viewer they would like to share the document with, the dialog box 418 may provide options for copying the link or sending the link 420 by email (422).

Once the presenter initiates the broadcast, the broadcast may begin and the presenter may immediately be taken to the default presenter's experience. The presenter may be enabled to choose to start the presentation from a number of views associated with the document. For example, in a presentation document, the document may be presented in full view mode, along with speaker's notes, or other formats. In a word processing document, a print mode, a multi-page mode, or comparable viewing modes may be selected by the presenter. Because the viewers view the presented document through the web application user interface in their respective browsers, they may be enabled to change a view mode in addition to being able to navigate independently through the broadcast document.

Figure 5:
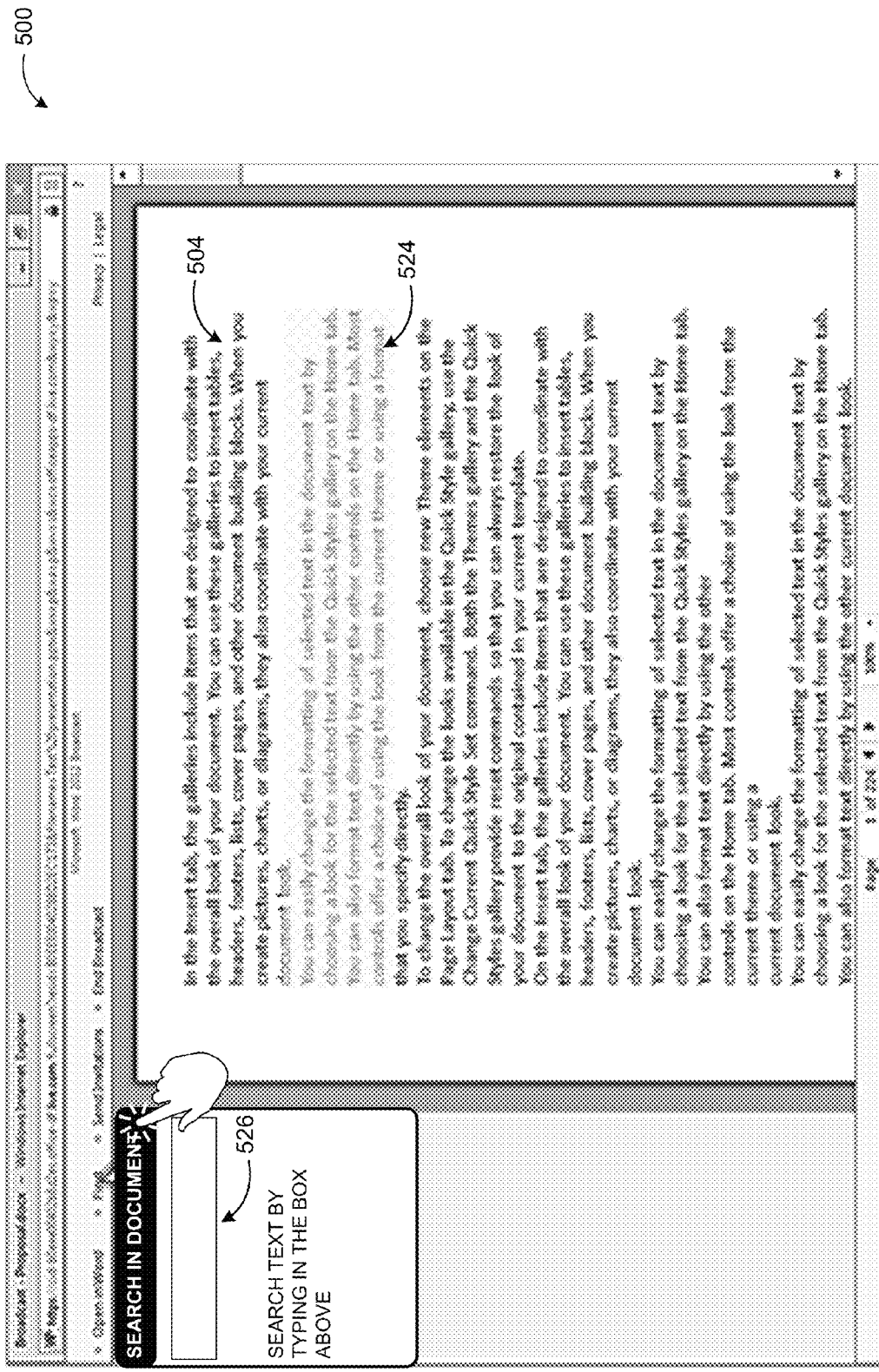
FIG. 5 illustrates a screenshot of the example browser view enabling the presenter to perform operations on the broadcast document while the document is being viewed by viewers.

FIG. 5 illustrates a screenshot of the example browser view enabling the presenter to perform operations on the broadcast document while the document is being viewed by viewers.

Screenshot 500 displays two example features that may be used by a presenter during a broadcast on a presented document.

The example features on screenshot 500 include a search feature, where the presenter may search for particular terms by entering them into search box 526 as the viewers watch the document synchronously. The actual search may be performed at the presenter's version of the broadcast document. Another feature that may enhance the sharing experience is highlighting. The presenter may highlight a portion 524 of document 504 showing emphasis, which may be presented to the viewers. When the presenter deselects the same block of text, the highlights may disappear in the viewers' view. The presenter's ability to highlight text may be at the paragraph, line, or word level of granularity as per a capability of the web application.

Other features that may be relayed to the viewers may include animation of objects, playing of embedded audio or video media, selecting comments within a document for viewing, and comparable ones.

Figure 6:
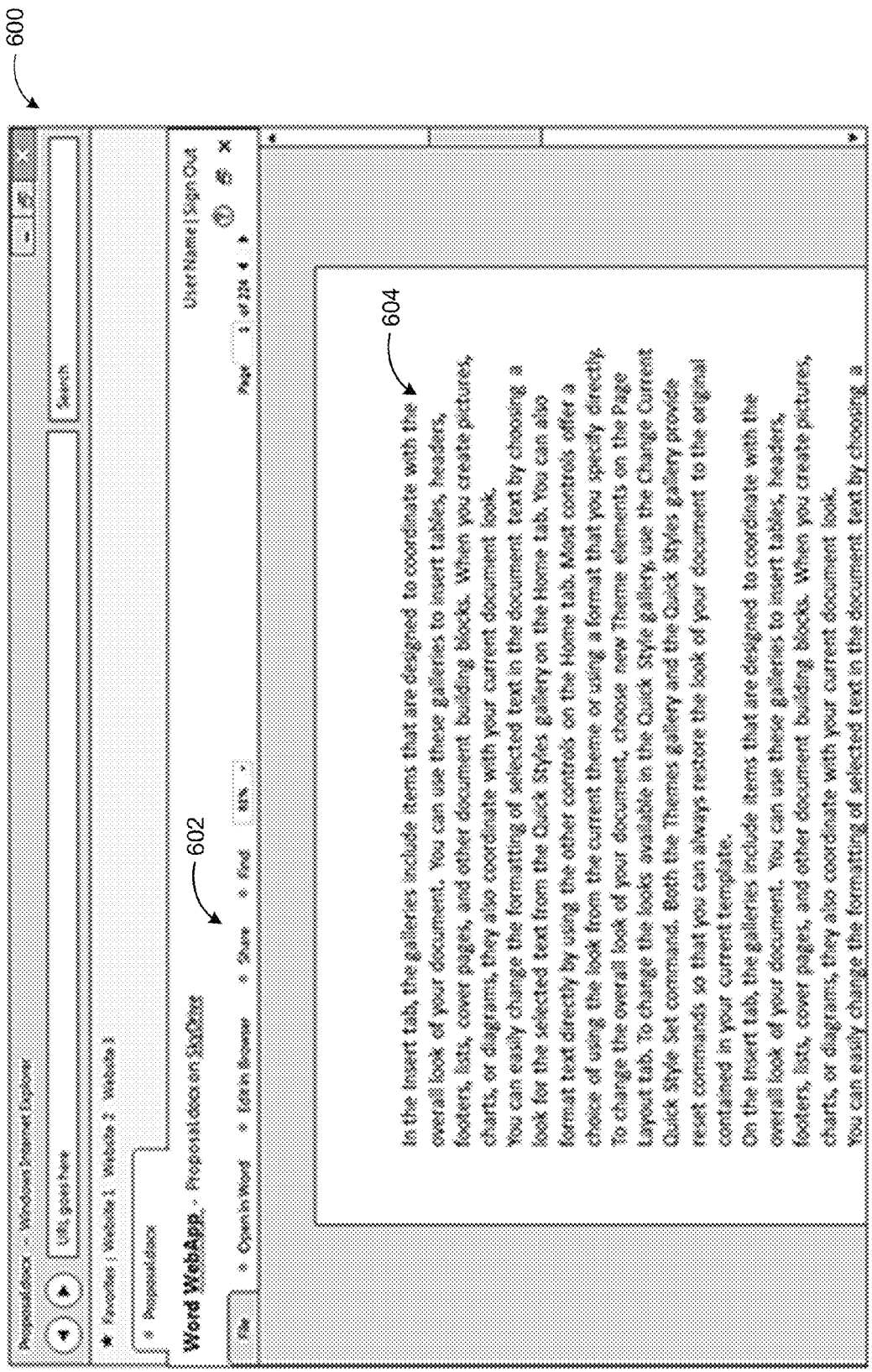
FIG. 6 illustrates a screenshot of the example browser view reverting to web based word processing application user interface upon termination of the broadcast session.

FIG. 6 illustrates a screenshot of the example browser view reverting to web based word processing application user interface upon termination of the broadcast session.

During the broadcast session, the presenter's user interface may surface an "End Broadcast" control. If a presenter selects the End Broadcast control, a dialog confirming that the intention is to end the broadcast may be surfaced. Any broadcast related windows that are open may be closed as part of ending the broadcast. For example, if a presenter has the full screen view open when ending the broadcast, this window may be closed as part of the end broadcast operation.

Once the broadcast has ended, a "browser-back" operation may be initiated navigating the presenter back to the screen of their original entry point. In the screenshot 600, the screen of original entry point includes a reading view mode of the textual content of document 604 and control menus 602 for managing the document.

In a system according to embodiments, any type of content may be broadcast with real time document presentation data synchronization. For example, word processing documents, spreadsheet documents, presentation documents, audio media, video media, graphic presentations, even email or similar textual and/or graphical documents may be broadcast using state data to synchronize viewers with a presenter.

The example systems in FIG. 1 through 3 have been described with specific configurations, applications, and interactions. Embodiments are not limited to systems according to these examples. A system for enabling real time document presentation data synchronization may be implemented in configurations employing fewer or additional components and performing other tasks. Furthermore, specific protocols and/or interfaces may be implemented in a similar manner using the principles described herein.

Figure 7:
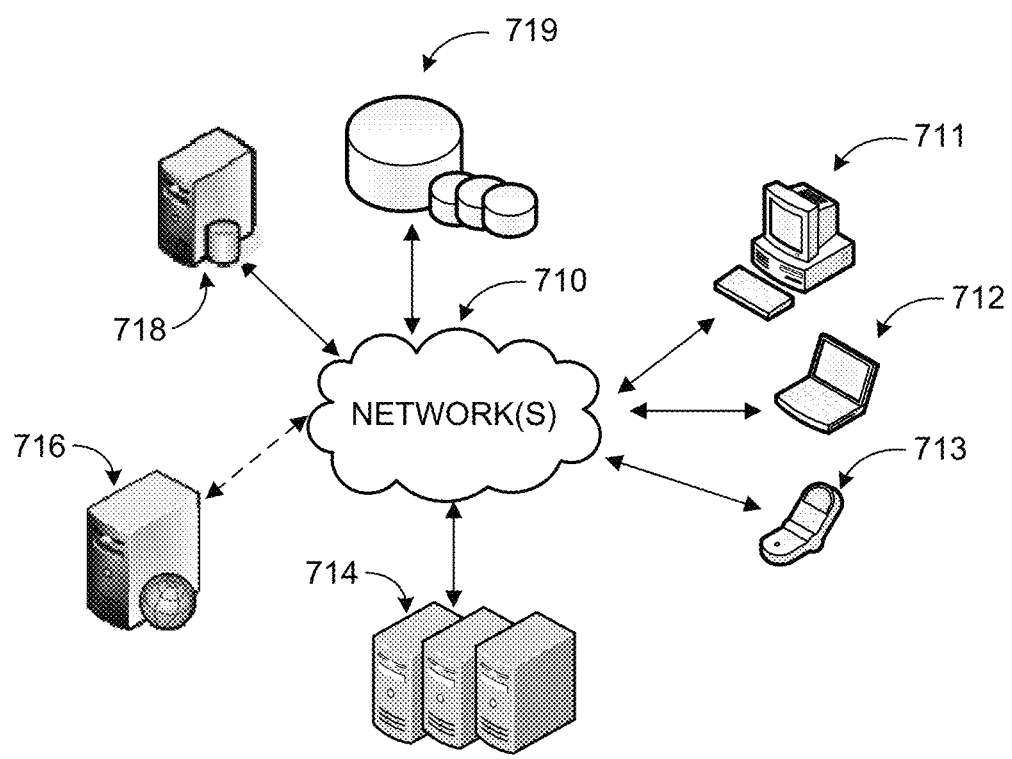
FIG. 7 is a networked environment, where a system according to embodiments may be implemented.

FIG. 7 is an example networked environment, where embodiments may be implemented. A system for enabling real time document sharing through browsers may be implemented via software executed over one or more servers 714 such as a hosted service. The platform may communicate with client applications on individual computing devices such as a smart phone 713, a laptop computer 712, or desktop computer 711 ('client devices') through network(s) 710.

Browsers executed on any of the client devices 711-713 may facilitate communications via web application(s) executed by servers 714, or on individual server 716, as well as viewing and editing of documents of various types. An application executed on one of the servers may facilitate broadcast of a document from a presenter. Viewers using client devices 711-713 may view synchronously with the presenter, navigate independently, and synchronize back with the presenter using their browsers on the client devices. The facilitating application may retrieve relevant data from data store(s) 719 directly or through database server 718, and provide requested services (e.g. document editing) to the user(s) through client devices 711-713.

Network(s) 710 may comprise any topology of servers, clients, Internet service providers, and communication media. A system according to embodiments may have a static or dynamic topology. Network(s) 710 may include secure networks such as an enterprise network, an unsecure network such as a wireless open network, or the Internet. Network(s) 710 may also coordinate communication over other networks such as Public Switched Telephone Network (PSTN) or cellular networks. Furthermore, network(s) 710 may include short range wireless networks such as Bluetooth or similar ones. Network(s) 710 provide communication between the nodes described herein. By way of example, and not limitation, network(s) 710 may include wireless media such as acoustic, RF, infrared and other wireless media.

Many other configurations of computing devices, applications, data sources, and data distribution systems may be employed to implement a platform for enabling real time document sharing through browsers. Furthermore, the networked environments discussed in FIG. 7 are for illustration purposes only. Embodiments are not limited to the example applications, modules, or processes.

Figure 8:
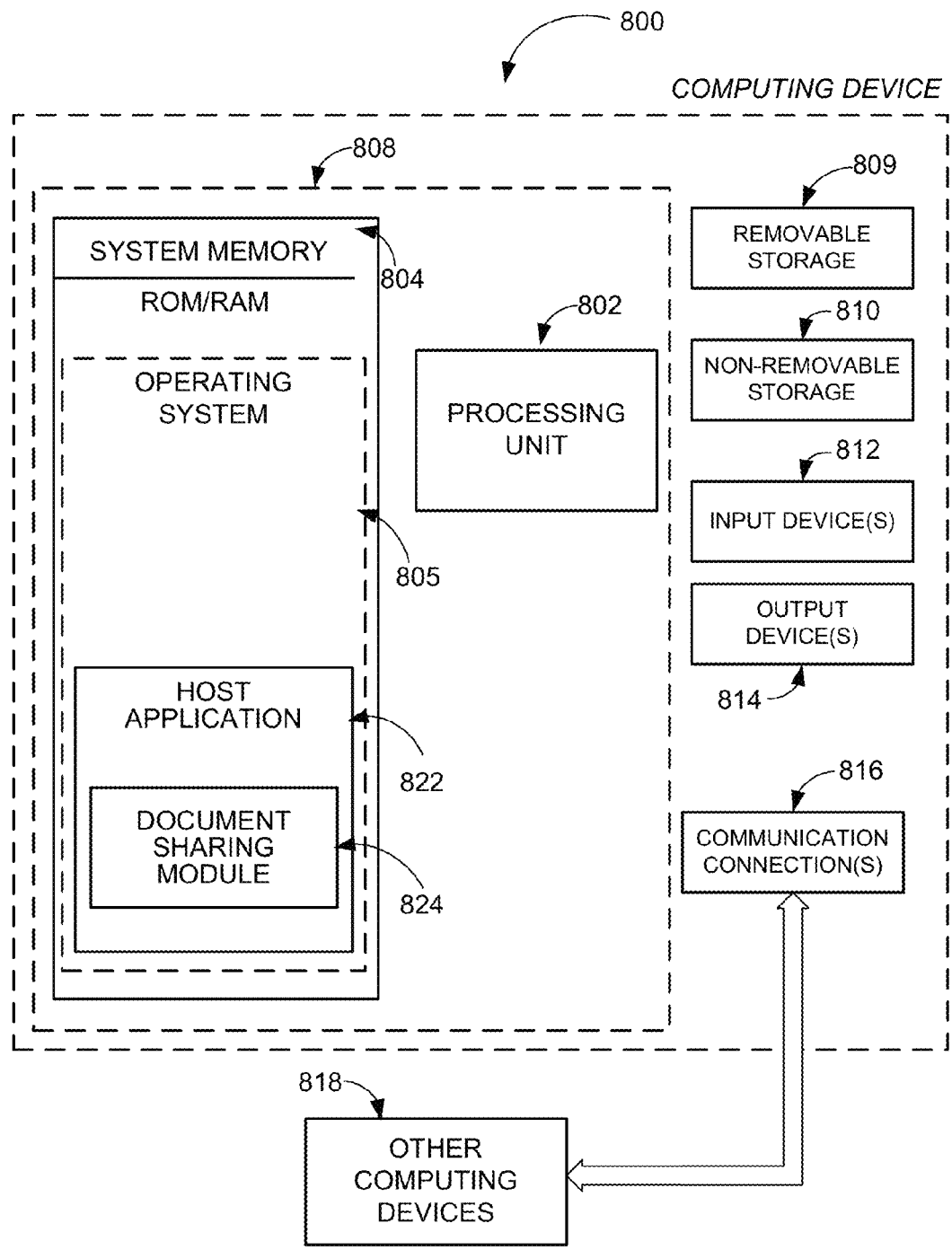
FIG. 8 is a block diagram of an example computing operating environment, where embodiments may be implemented.

FIG. 8 and the associated discussion are intended to provide a brief, general description of a suitable computing environment in which embodiments may be implemented. With reference to FIG. 8, a block diagram of an example computing operating environment for an application according to embodiments is illustrated, such as computing device 800. In a basic configuration, computing device 800 may be any computing device facilitating online broadcasting of documents with real time sharing through browsers according to embodiments and include at least one processing unit 802 and system memory 804. Computing device 800 may also include a plurality of processing units that cooperate in executing programs. Depending on the exact configuration and type of computing device, the system memory 804 may be volatile (such as RAM), non-volatile (such as ROM, flash memory, etc.) or some combination of the two. System memory 804 typically includes an operating system 805 suitable for controlling the operation of the platform, such as the WINDOWS® operating systems from MICROSOFT CORPORATION of Redmond, Wash. The system memory 804 may also include one or more software applications such as a web application 822, and document sharing module 824.

Web application 822 may enable viewing and editing of documents of various types for users through their browsers. In addition, web application 822 may enable broadcasting of a document presentation by a presenter to one or more viewers through document sharing module 824. Web application 822 and document sharing module 824 may be separate applications or integrated modules of a hosted service. This basic configuration is illustrated in FIG. 8 by those components within dashed line 808.

Computing device 800 may have additional features or functionality. For example, the computing device 800 may also include additional data storage devices (removable and/or non-removable) such as, for example, magnetic disks, optical disks, or tape. Such additional storage is illustrated in FIG. 8 by removable storage 809 and non-removable storage 810. Computer readable storage media may include volatile and nonvolatile, removable and non-removable media implemented in any method or technology for storage of information, such as computer readable instructions, data structures, program modules, or other data. System memory 804, removable storage 809 and non-removable storage 810 are all examples of computer readable storage media. Computer readable storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and which can be accessed by computing device 800. Any such computer readable storage media may be part of computing device 800. Computing device 800 may also have input device(s) 812 such as keyboard, mouse, pen, voice input device, touch input device, and comparable input devices. Output device(s) 814 such as a display, speakers, printer, and other types of output devices may also be included. These devices are well known in the art and need not be discussed at length here.

Computing device 800 may also contain communication connections 816 that allow the device to communicate with other devices 818, such as over a wired or wireless network in a distributed computing environment, a satellite link, a cellular link, a short range network, and comparable mechanisms. Other devices 818 may include computer device(s) that execute communication applications, web servers, and comparable devices. Communication connection(s) 816 is one example of communication media. Communication media can include therein computer readable instructions, data structures, program modules, or other data. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 9:
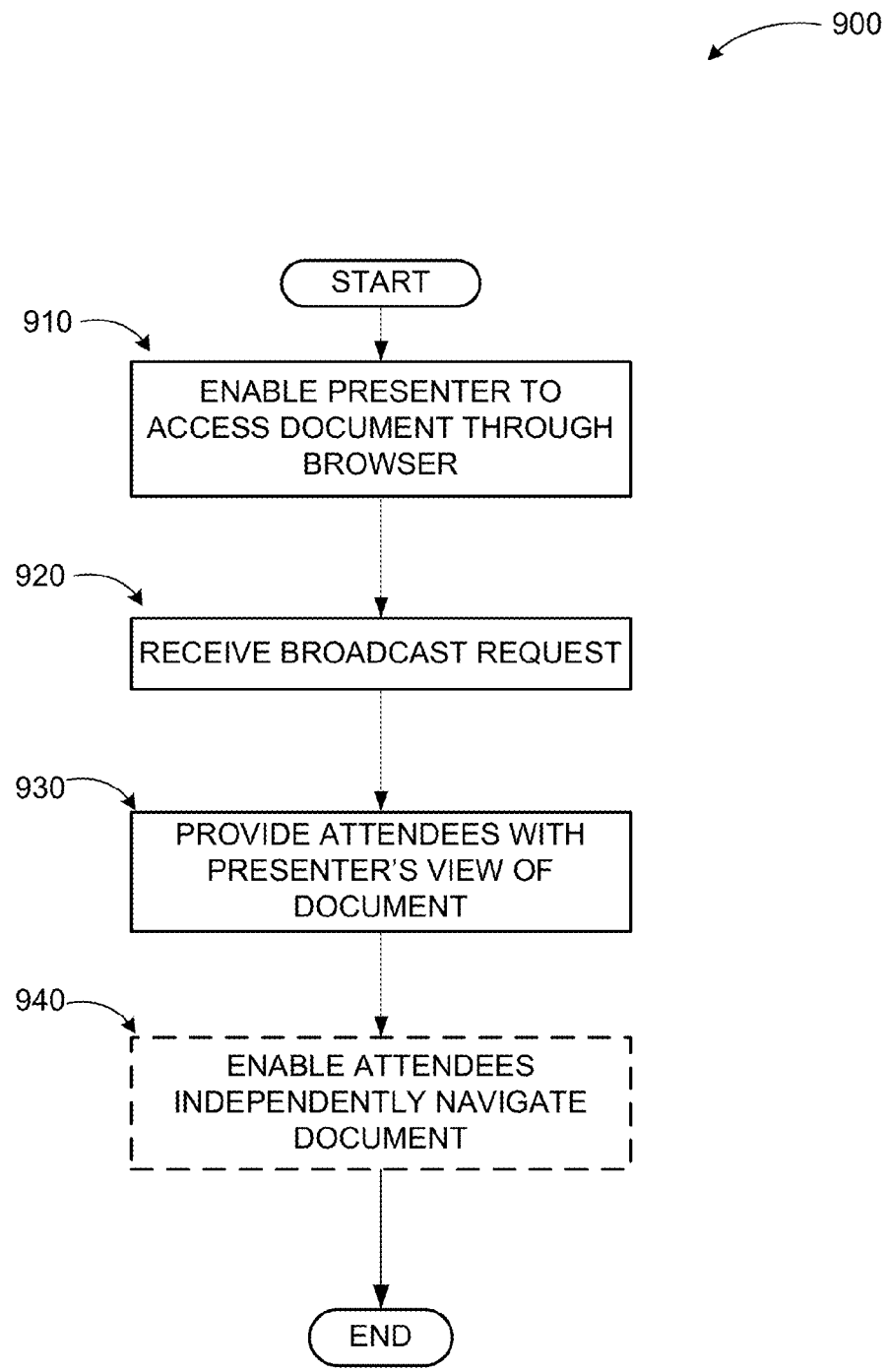
FIG. 9 illustrates a logic flow diagram for process 900 of real time document sharing through browsers according to embodiments.

FIG. 9 illustrates a logic flow diagram for process 900 of real time document sharing through browsers according to embodiments. Process 900 may be implemented on a computing device or similar electronic device capable of executing instructions through a processor.

Process 900 begins with operation 910, where a presenter may be enabled to access a document through their browser by a web application. The presenter may be enabled to create new documents, edit existing documents, and also be provided with a control enabling them to initiate a broadcast session.

At operation 920, the web application may receive a request to initiate a broadcast session from the presenter. The server executing the web application may provide the presenter with a link to send to viewers in order to view the to-be-shared document. The presenter may send the link by email or other means to viewers.

At operation 930, the viewers may be provided with the presenter's view of the document through their browsers such that they can synchronously view the document as the presenter navigates through it. In some embodiments, the viewers may also be enabled to independently navigate through the document at their own pace, initiate animations or embedded media, etc. at optional operation 940. The viewers may also be enabled to synchronize back with the presenter after viewing the document asynchronously for a period of time.

The operations included in process 900 are for illustration purposes. Real time document sharing through browsers according to embodiments may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed at least in part in a computing device for sharing documents synchronously between a presenter and one or more viewers through browsers, the method comprising:
    enabling the presenter to initiate a broadcast session;
    upon receiving a broadcast request from the presenter, providing the presenter with a link to a document to-be-shared;
    enabling the presenter to send the link to the one or more viewers;
    enabling the one or more viewers to view the document synchronously with the presenter in response to activating the link received from the presenter;
    enabling the one or more viewers to navigate through the document independently from the presenter and to synchronize back with the presenter after viewing the document asynchronously for a period;
    if the presenter has edited the document while a viewer is navigating through the document independently from the presenter, providing the viewer with an alert upon detecting an attempt by the viewer to synchronize back with the presenter; and
    enabling the one or more viewers to refresh the document if modified by the presenter while viewing the document asynchronously.

2. The method of claim 1, further comprising creating a temporary copy of the document upon receiving the broadcast request, wherein the link points to the temporary copy.

3. The method of claim 1, wherein the presenter is enabled to share the document through a user interface within a browser, the user interface being provided by a web application enabling the presenter to edit the document.

4. The method of claim 1, wherein the one or more viewers are enabled to view the document through a user interface within their respective browsers, the user interface being provided by a web application enabling the viewers to view and navigate through the document.

5. The method of claim 1, further comprising upon receiving the broadcast request presenting a dialog box indicating that a document sharing process is beginning and a cancel option enabling the presenter to opt out of the broadcast.

6. The method of claim 5, further comprising displaying an indication to the presenter that the link is to be provided to a viewer to share the document, the link, an option for copying the link, and another option for sending the link by one of an email and a text message.

7. The method of claim 1, further comprising enabling the presenter to select from a plurality of view modes associated with the document for sharing the document with the viewers.

8. The method of claim 7, further comprising enabling the viewers to change the view mode selected by the presenter during the broadcast.

9. The method of claim 1, wherein the document includes one or more of textual content, graphical content, animated objects, audio content, and video content.

10. The method of claim 1, wherein the document includes one or more of: a word processing document, a spreadsheet document, a presentation document, audio media, video media, a graphic presentation, an email, and a textual and/or graphical document.

11. A server for facilitating sharing of documents synchronously between a presenter and one or more viewers through browsers, the server comprising:
a memory;
a processor coupled to the memory, the processor executing a web application providing a user interface, wherein the user interface is configured to:
enable the presenter to initiate a broadcast session;
upon receiving a broadcast request from the presenter, provide the presenter with a link to a document to-be-shared;
enable the presenter to send the link to the one or more viewers;
enable the one or more viewers to:
view the document synchronously with the presenter in response to activating the link received from the presenter;
select an asynchronous viewing mode of the document independently from a synchronous viewing mode of the document;
navigate through the document independently from the presenter;
synchronize back with the presenter after viewing the document asynchronously for a period;
if the presenter has edited the document while a viewer is navigating through the document independently from the presenter, provide the viewer with an alert upon detecting an attempt by the viewer to synchronize back with the presenter; and
refresh the document if modified by presenter while viewing the document asynchronously.

12. The server of claim 11, wherein the web application enables the presenter to initiate the broadcast through a document sharing control within a web application viewer and editor user interface displayed by a browser of the presenter and the viewers to view the document through the web application viewer and editor user interface displayed by their respective browsers.

13. The server of claim 11, wherein the web application is further configured to:
search for a term on a version of the document viewed by the presenter by entering the term into a search box within the user interface as the viewers view the document synchronously.

14. The server of claim 13, wherein the web application is further configured to:
provide one of a navigation pane and an internal document hyperlink to enable jumping to a different section of the viewed document.

15. The server of claim 14, wherein the web application is further configured to:
enable the presenter to perform one or more of highlighting a portion of the document, animation of objects, playing of embedded audio media, playing of embedded video media, and selecting comments within the document as the viewers view the document and effects of presenter actions synchronously.

16. The server of claim 11, wherein highlighting is removed upon deselection by the presenter and textual content is highlighted at one of a paragraph, line, and word level granularity based on a capability of the web application.

17. The server of claim 11, wherein the web application is a productivity web application associated with one of: word processing, spreadsheet processing, presentation, graphics processing, note taking, and email exchange.

18. A computer-readable memory device with instructions stored thereon for sharing documents synchronously between a presenter and one or more viewers through browsers, the instructions comprising:
enabling the presenter to initiate a broadcast session;
upon receiving a broadcast request from the presenter and providing the presenter with a link to a document to-be-shared;
enabling the presenter to send the link to the one or more viewers;
enabling the one or more viewers to view the document synchronously with the presenter in response to activating the link received from the presenter;
enabling the one or more viewers to select an asynchronous viewing mode of the document independently from a synchronous viewing mode of the presented document;
enabling the one or more viewers to navigate through the document independently from the presenter and synchronize back with the presenter after viewing the document asynchronously for a period;
enabling the one or more viewers to refresh the document if modified by the presenter while viewing the document asynchronously;
if the presenter has edited the document while a viewer is navigating through the document independently from the presenter, providing the viewer with an alert upon detecting an attempt by the viewer to synchronize back with the presenter; and
enabling the presenter to select from a plurality of view modes associated with the document for sharing the document with the one or more viewers.

19. The computer-readable memory device of claim 18, wherein the instructions further comprise:
displaying a control to end the broadcast; and
in response to activating the control to end the broadcast:
displaying a dialog confirming that presenter's intention is to end the broadcast,
closing open user interfaces associated with the broadcast,
performing a browser-back operation navigating the presenter back to a screen of their original entry point; and
providing an indication to the viewers that the broadcast is being terminated.

* * * * *